April 9, 1957  A. J. FRIEDMAN  2,788,115
DISTRIBUTOR FOR SILOS
Filed Aug. 2, 1954
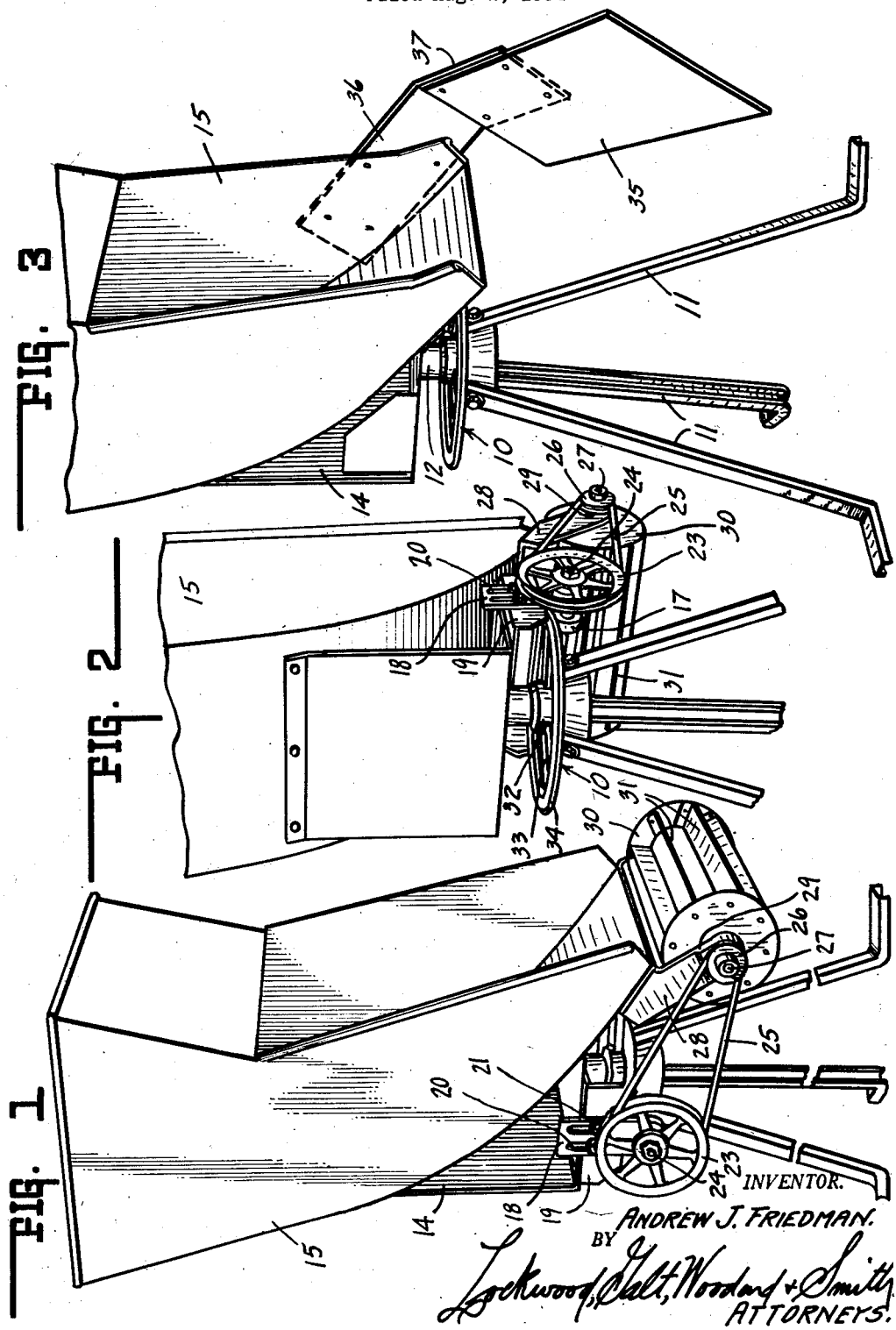
INVENTOR.
ANDREW J. FRIEDMAN.
BY
Lockwood, Galt, Woodard & Smith
ATTORNEYS.

United States Patent Office 2,788,115
Patented Apr. 9, 1957

2,788,115

DISTRIBUTOR FOR SILOS

Andrew J. Friedman, West Lafayette, Ind.

Application August 2, 1954, Serial No. 447,063

5 Claims. (Cl. 198—128)

This invention relates generally to distributors for silos, and more particularly to a self-propelled silage distributor.

A self-propelled silage distributor is shown in United States Letters Patent No. 2,681,726 granted to Andrew J. Friedman et al. on June 22, 1954. This particular distributor and other conventional silage distributors include mechanism for rotatably supporting them from a stationary chute normally connected to a silage cutter and blower. It is inherent in silage distributors which are rotatably mounted on a stationary chute that debris collects in the rotatable mounting structure, thereby preventing free rotation of the distributor.

The principal object of this invention is to provide a silage distributor mounted for rotary motion and provided with bearing structure which includes structure adapted inherently to prevent collection of debris and insures free rotary motion.

Another object of this invention is to provide a novel means of driving a rotary silage distributor.

In accordance with this invention there is provided a silage distributor comprising a base, a bearing mounted on said base, a hopper and chute structure and bracket means for supporting said hopper and chute structure over said bearing, thereby to protect said bearing from accumulation of debris.

In accordance with another feature of this invention there is provided a silage distributor comprising a base, a bearing mounted on said base, a chute and hopper structure mounted on said bearing, and a reaction means disposed in the path of silage flowing out of said chute for imparting rotary motion by means of reactive forces to said hopper and chute structure.

The full nature of the invention will be understood from the accompanying drawings and the following description and claims:

Fig. 1 is a front and side perspective view of a silage distributor embodying this invention.

Fig. 2 is a rear and side perspective view of the structure shown in Fig. 1.

Fig. 3 is a front and side perspective view of a rotary silage distributor including a reactive driving means.

The rotary silage distributor which is provided in accordance with this invention comprises a base member 10 to which may be attached to a plurality of legs 11 for mounting the distributor on a catwalk normally provided across the upper end of silos. The base 10 includes a conventional bearing member 12 on which may be mounted for rotary motion a bracket 14 and a hopper and chute member 15 suitably attached to said bracket member. The legs 11 may be attached to a catwalk to align hopper-chute 15 with the conventional chute attached to a silage cutter and blower so that silage may pour therefrom into the hopper-chute 15. The end of the silage cutter and blower chute may project downwardly well within hopper-chute 15, whereby all silage will continue through hopper-chute 15 rather than escaping to fall freely without distribution.

It will be understood that the bracket 14 may be connected in any suitable manner to a vertical shaft rotatably supported by bearing 12, whereby the chute and hopper structure 15 may rotate to distribute silage as it pours from the chute portion of hopper-chute structure 15. For imparting rotary motion to the hopper and chute structure 15, there is provided a drive wheel 17 engaging the lower surface of the annular base 10. Wheel 17 may be supported in a bearing (not shown) mounted in the lower end of plate 18. For supporting plate 18 there is provided a bracket member 19 depending from the lower side of bracket 14. Plate 18 may be provided with slots 20 adapted to receive bolts 21, whereby wheel 17 may be adjusted into contact with the lower surface of base 10 with any desired degree of pressure.

Wheel 17 may be driven by the pulley 23 supported on a common shaft 24 and driven by a belt 25 running over the pulley 26 mounted on shaft 27. The bracket 28 may be attached to the lower end of hopper-chute 15 and includes two depending legs 29, only one of which appears in the drawing. Shaft 27 may be mounted in suitable bearings at the outer extremities of legs 29. For driving shaft 27 there is provided a paddle wheel 30 having a plurality of radial paddles 31 and being mounted in fixed relation to shaft 27. Thus, silage pouring out of the hopper-chute 15 engages the paddles 31 of wheel 30 to drive pulleys 26 and 23 and therewith drive wheel 17. Since the annular base 10 is stationary, the rotary motion is imparted to the hopper-chute.

It is to be noted that the structure for rotatably supporting the hopper-chute 15 is located beneath the hopper-chute, whereby flying debris can not collect in the way of any rotating structure. Furthermore, with bearing 12 totally closed and wheel 17 engaging the lower surface of base 10, no debris can accumulate to prevent effective frictional engagement between wheel 17 and the lower surface of base 10. It may also be noted that base 10 is not a solid plate but is provided with a hub portion 32 supporting spokes 33 and therewith the rim portion 34 of base 10.

Fig. 3 illustrates another embodiment of this invention which is identical in all respects to that shown in Figs. 1 and 2 except that the paddle wheel 30 and its associated drive structure is eliminated and a reactive deflector plate 35 is substituted therefor. This plate lies at an angle to the path of movement of silage flowing from hopper-chute 15 and is supported in this relation by means of a plate 36 fixed to the side of chute 15, and including an angle portion 37 to which deflector plate 35 is attached. When silage flows from chute 15, it impacts plate 35; and since plate 35 is disposed at an angle to the path of movement of the silage, reactive forces are created which impart rotary motion to the hopper-chute 15. In many cases there is a substantial blast of air created by silage cutters and blowers, and this blast of air coming out of hopper-chute 15 and impacting plate 35 adds to the reactive forces for rotating hopper-chute 15.

From the foregoing description it will be apparent that this invention provides novel rotary supporting structure for silage distributors which inherently can not collect debris and become clogged. Also, this invention provides a simplified driving structure for silage distributors.

The invention claimed is:

1. A silage distributor comprising a base member having a hub, spokes therein and a rim supported by said spokes, a bearing mounted in the hub of said base member, a hopper-chute adapted to receive silage from a stationary chute, a bracket fixed beneath said hopper-chute and rotatably mounted over and on said bearing, a drive wheel adjustably mounted on said bracket in engagement with the lower surface of the rim of said base, and drive means connected to said drive wheel.

2. A silage distributor comprising a base member having an annular rim, a bearing mounted in said base member, a hopper-chute adapted to receive silage from a stationary chute, a bracket fixed beneath said hopper-chute and rotatably mounted over and on said bearing, a drive wheel adjustably mounted on said bracket in engagement with the rim of said base, and drive means connected to said drive wheel.

3. A silage distributor comprising a base member having a hub, spokes therein and a rim supported by said spokes, a bearing mounted in the hub of said base member, a hopper-chute adapted to receive silage from a stationary chute, a bracket fixed beneath said hopper-chute and rotatably mounted over and on said bearing, and a deflector fixed to said hopper-chute in the path of silage flowing therefrom at an angle to said path to provide a rotative driving force on said hopper-chute.

4. A silage distributor comprising a base member, a bearing mounted in said base member, a hopper-chute adapted to receive silage from a stationary chute, a bracket fixed beneath said hopper-chute and rotatably mounted over and on said bearing, and a deflector fixed to said hopper-chute in the path of silage flowing therefrom at an angle to said path to provide a rotative driving force on said hopper-chute.

5. A silage distributor comprising a base member, a bearing mounted in said base member, a hopper-chute adapted to receive silage from a stationary chute and rotatably mounted over and on said bearing, and means fixed to said hopper-chute in the path of silage at an angle to said path to provide a rotative driving force on said hopper-chute.

References Cited in the file of this patent

UNITED STATES PATENTS

| 246,362 | Angell | Aug. 30, 1881 |
| 1,814,619 | Carter | July 14, 1931 |
| 2,681,726 | Friedman et al. | June 22, 1954 |

FOREIGN PATENTS

| 284,082 | Great Britain | Jan. 26, 1928 |